(12) United States Patent
Schneider (10) Patent No.: US 10,228,986 B2
(45) Date of Patent: Mar. 12, 2019

(54) INTERFACE-ADAPTIVE DATA EXCHANGE

(71) Applicant: AgileDelta, Inc., Bellevue, WA (US)

(72) Inventor: John C. Schneider, Bellevue, WA (US)

(73) Assignee: AGILEDELTA, INC., Bellevue, WA (US)

( * ) Notice: Subject to any disclaimer, the term of this patent is extended or adjusted under 35 U.S.C. 154(b) by 210 days.

(21) Appl. No.: 13/631,695

(22) Filed: Sep. 28, 2012

(65) Prior Publication Data

US 2013/0086016 A1    Apr. 4, 2013

Related U.S. Application Data

(60) Provisional application No. 61/541,071, filed on Sep. 29, 2011.

(51) Int. Cl.
  *G06F 17/30* (2006.01)
  *G06F 9/54* (2006.01)
  *G06F 17/22* (2006.01)

(52) U.S. Cl.
  CPC ........ *G06F 9/541* (2013.01); *G06F 17/30309* (2013.01); *G06F 17/2288* (2013.01)

(58) Field of Classification Search
  CPC ........... G06F 17/30309; G06F 17/3023; G06F 17/2288; G06F 9/541

(Continued)

(56) References Cited

U.S. PATENT DOCUMENTS 6,279,004 B1 *   8/2001   Lee .................. G06F 17/30309
                                              707/695
7,107,594 B1     9/2006   Fischer et al.
(Continued)

FOREIGN PATENT DOCUMENTS

WO        WO 0159966 A1 *   8/2001

OTHER PUBLICATIONS

International Search Report & Written Opinion for PCT/US2012/058108, dated Mar. 4, 2013, 10 pages.

*Primary Examiner* — Pierre M Vital
*Assistant Examiner* — Nargis Sultana
(74) *Attorney, Agent, or Firm* — Schwabe, Williamson & Wyatt, P.C.

(57) ABSTRACT

In embodiments, apparatuses, computer-readable media, and methods for interface-adaptive data exchange may be described. A sender and a receiver may communicate using different versions of a data exchange interface. A serializer may be configured to obtain data generated according to a first version of the data exchange interface and to write data to a communication medium for communication to the receiver such that it may be understood by the receiver based on the receiver's version of the data exchange interface. The serializer may be configured to omit one or ones of data that may be not be understood by the receiver based on the receiver's version of the data exchange interface. In some embodiments, the serializer may omit one or ones of data which are not permitted in the current context according to the interface definition. In various embodiments, the serializer may determine the extent of the omitted data based on an end delimeter, a length of data to-be-omitted, or a description of the sender's version of the data exchange interface. Other embodiments may be described.

16 Claims, 6 Drawing Sheets

(58) Field of Classification Search
USPC .......................................................... 707/695
See application file for complete search history.

(56) References Cited

U.S. PATENT DOCUMENTS

| | | | |
|---|---|---|---|
| 7,392,243 B2* | 6/2008 | Brown et al. | |
| 7,765,194 B1 | 7/2010 | Sharma et al. | |
| 7,970,779 B2* | 6/2011 | Smirnov et al. ............. | 707/756 |
| 7,975,223 B2* | 7/2011 | Plumley et al. .............. | 715/255 |
| 2002/0184269 A1* | 12/2002 | Imagou ............ | G06F 17/30569 |
| | | | 715/229 |
| 2003/0145315 A1* | 7/2003 | Aro ........................ | G06F 9/541 |
| | | | 717/170 |
| 2005/0108272 A1* | 5/2005 | Behrens .................. | G06F 9/546 |
| 2005/0131964 A1* | 6/2005 | Saxena ..................... | G06F 8/71 |
| 2005/0251809 A1 | 11/2005 | Gunduc et al. | |
| 2006/0062208 A1* | 3/2006 | Li et al. ........................ | 370/352 |
| 2006/0085456 A1* | 4/2006 | Pickering .......... | G06F 17/30309 |
| 2006/0161562 A1* | 7/2006 | McFarland et al. .......... | 707/100 |
| 2006/0256759 A1* | 11/2006 | Sayeedi ...................... | 370/335 |
| 2006/0262780 A1* | 11/2006 | Robinson, Jr. ................ | 370/376 |
| 2006/0294159 A1* | 12/2006 | Dettinger et al. ............ | 707/203 |
| 2007/0088733 A1* | 4/2007 | Bodge ............. | G06F 17/30312 |
| 2007/0088766 A1* | 4/2007 | Bodge et al. ................ | 707/203 |
| 2007/0147381 A1* | 6/2007 | Wilhelm ........................ | 370/392 |
| 2007/0162274 A1* | 7/2007 | Ruiz ................. | G06F 17/30398 |
| | | | 704/9 |
| 2007/0239393 A1* | 10/2007 | Schneider et al. ............ | 702/127 |
| 2008/0089244 A1 | 4/2008 | Yu | |
| 2008/0114766 A1* | 5/2008 | Asmi et al. ........................ | 707/8 |
| 2008/0271055 A1* | 10/2008 | Fink .......................... | G06F 9/54 |
| | | | 719/320 |
| 2010/0115125 A1* | 5/2010 | Peterson ............. | H04L 12/2805 |
| | | | 709/236 |
| 2010/0115126 A1* | 5/2010 | Kanakadandi .... | G06F 17/30309 |
| | | | 709/237 |
| 2010/0161828 A1* | 6/2010 | Hiltunen et al. ............. | 709/232 |
| 2011/0016099 A1* | 1/2011 | Peer et al. ..................... | 707/695 |
| 2011/0022827 A1 | 1/2011 | Plache et al. | |
| 2011/0093483 A1* | 4/2011 | Apostolopoulos .......................... | |
| | | | G06F 17/30575 |
| | | | 707/758 |
| 2012/0016849 A1* | 1/2012 | Garrod et al. ................ | 707/695 |
| 2012/0109905 A1* | 5/2012 | Tingstrom ............ | G06F 17/227 |
| | | | 707/690 |
| 2012/0284231 A1* | 11/2012 | Basescu .......... | G06F 17/30309 |
| | | | 707/638 |
| 2013/0086016 A1* | 4/2013 | Schneider ............... | G06F 9/541 |
| | | | 707/695 |
| 2013/0173541 A1* | 7/2013 | Iyer et al. ..................... | 707/625 |

* cited by examiner

INTERFACE-ADAPTIVE DATA EXCHANGE

PRIORITY TO RELATED APPLICATIONS

This application claims the benefit of U.S. Provisional Application No. 61/541,071, entitled "Interface Adaptive Data Serialization," filed Sep. 29, 2011, which is hereby fully incorporated by reference.

BACKGROUND

Devices that communicate with each other, such as over a network, may often make use of interfaces or protocols that may define or describe types and/or formats of data that may be exchanged between the devices. For example, in various smart power systems, a power meter may send power usage data to a receiving device using an interface understood by both devices. Over time, however, the capabilities of one or both of the devices may be modified or otherwise updated. In some circumstances, the data exchange interface used between the devices may be updated to a new version as well, such as in order to support the modifications to the capabilities of the devices.

However, in some scenarios, it may not be possible, or desirable, for both devices to utilize the same version of the data exchange interface. For instance, in the smart power example described above, updates to the power meter may be remotely managed by the power company and may occur on a completely different schedule than updates to the receiving device, which might be controlled by individual home/building owners and completed when convenient (if ever). In addition, some devices may intentionally implement custom versions of standard data exchange interfaces to support vendor-specific extensions and proprietary features that provide a competitive edge. These receivers may therefore be difficult to update to a new interface version. Additionally, some devices may lack the facility to be updated—for example, some devices may implement a data exchange interface in hardware logic, or may lack sufficient storage or additional computing power to incorporate an update to an interface. Thus, even when the sending device is able to be updated, the receiving device may not be able to be updated as regularly, if at all. For these and other reasons, two devices which intended to communicate may find themselves relying on mismatched versions of a data exchange interface.

In some existing techniques, this potential mismatch may be addressed utilizing code or other logic operated by the receiver device to translate between different interface versions. However, receiver-side translation may be hard to implement efficiently on low-power receivers. Further it may be just as difficult to keep translation logic up-to-date as it would be to update a receiver's interface logic. Thus, such receiver code may not deal well with continued updates to the interface on the sender end.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
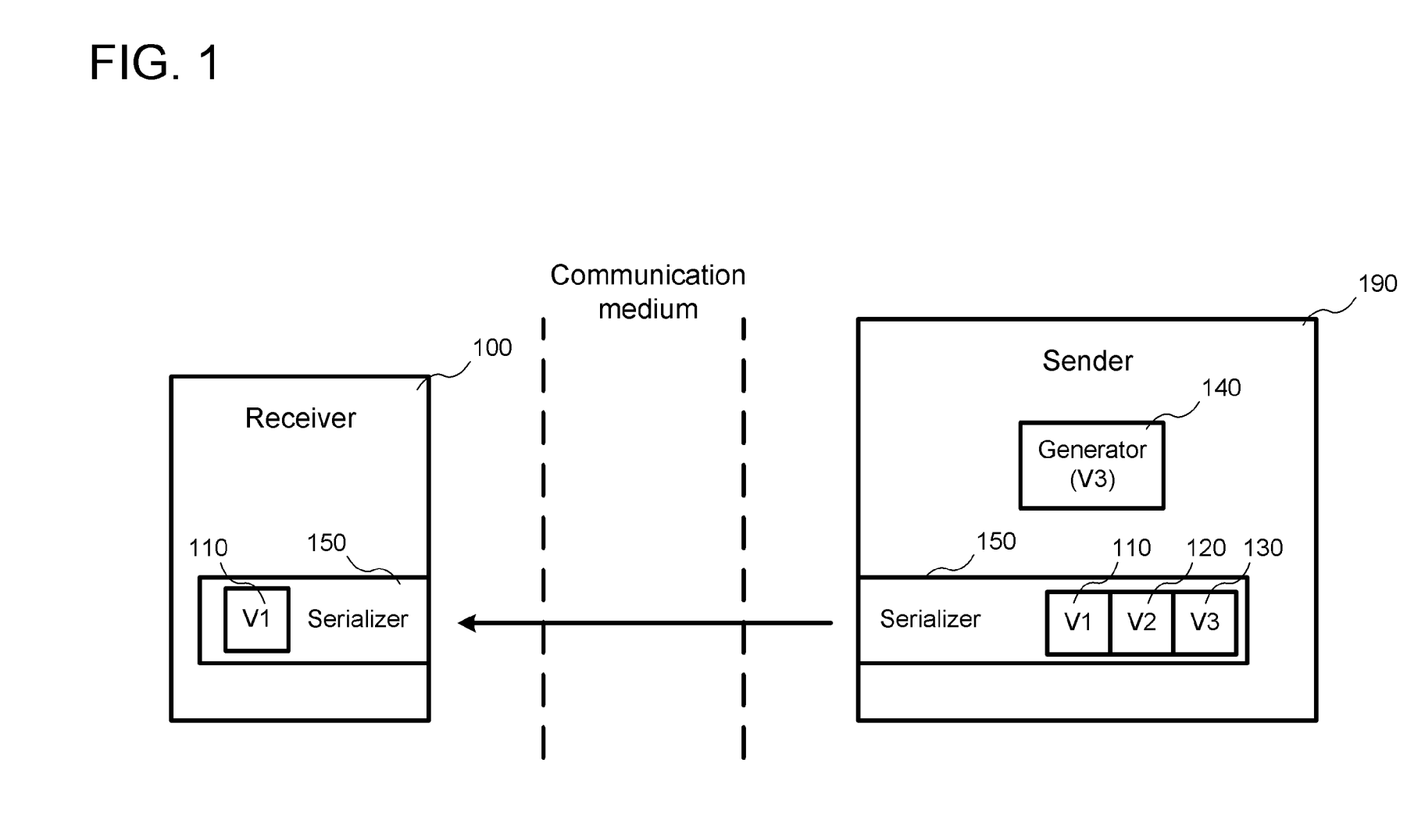
FIG. 1 is a block diagram illustrating example components used in interface-adaptive data exchange, in accordance with various embodiments.

Referring now to FIG. 1, examples of interface-adaptive data exchange are shown between a receiver 100 and a sender 190, where the sender 190 is sending data to the receiver 100. The data may be generated at the sender 190 by a generator 140. As illustrated, the sender 190 and the receiver 100 may have knowledge of one or more versions of a data exchange interface that may be used to describe data that may be sent between the sender 190 and the receiver 100. However, the sender 190 may, in various embodiments, have been updated to generate data according to a newer or extended version of the data exchange interface than that known by the receiver 100. Thus, as illustrated, the generator 140 of the sender 190 may generate data in version V3 130, while the receiver 100 may have knowledge only of V1 110. This may lead to a mismatch between the sender 190 and the receiver 100; for example, the sender 190 may, relying on its later or extended version of the data exchange interface, generate information which the receiver 100 cannot understand.

Figure 2:
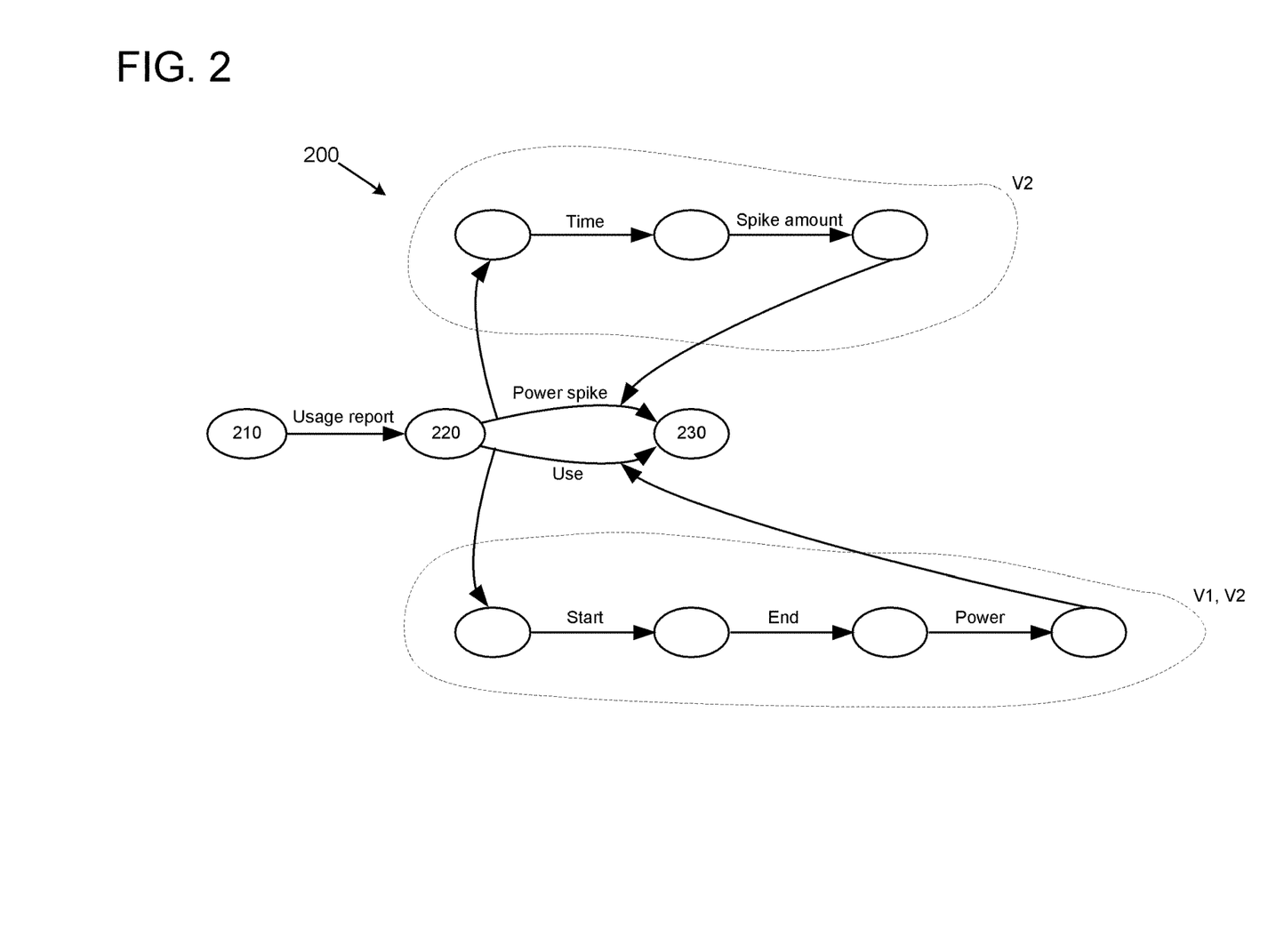
FIG. 2 illustrates an example finite automata for different versions of a data exchange interface, in accordance with various embodiments.

This mismatch may be understood using an example data exchange interface. FIG. 2 illustrates an example finite automaton 200 for different versions of a data exchange interface, in accordance with various embodiments. In addition to the examples described herein, further examples of the usage of finite automata to describe data exchange interfaces may be found in U.S. Pat. No. 7,565,339, entitled "Knowledge Based Encoding of Data," filed Mar. 31, 2006, which is herein incorporated by reference in its entirety. In various embodiments, the example automaton 200 may describe a data exchange interface for sending a usage report, such as, for example, from a smart power meter. In various embodiments the automaton 200 may include transitions that describe specific data sent from a power meter. For the ease of illustration, the illustrated automaton 200 may show transitions for both a version V1 and a version V2 of a data exchange interface; however, in various embodiments, an automaton that is describing V1 of the data exchange interface may not include the transitions that are used in the V2 version of the interface.

The automata 200 may include a state 210, where there is a "Usage report" transition to a state 220. From this state 220, there may be one or more transitions, which may also depend on the version of the data exchange interface. Thus, in both V1 and V2 version of the data exchange interface, the automata may describe a transition to a state 230 along a "Use" transition, such as to describe normal usage of power measured by the power meter. In contrast, the automata also describes a "Power spike" transition to the state 230, but this transition only exists in the V2 version of the interface. Further, within a particular transition, the automaton 200 may describe additional transitions to further provide other information related to the usage or power spike information. For example the automaton 200 may describe that, in both versions of the interface, the interface may expect "Start," "End," and "Usage" transitions to provide particular pieces of information related to normal power usage. Similarly, in version V2 of the interface, the automaton 200 describes "Time" and "Spike amount" transitions.

It may be noted that, in various embodiments, a device implementing an older version of a data exchange interface may not understand information sent according to a newer or extended version of the interface. Thus, for example, if a receiver 100 implements only version V1 of a data exchange interface that is described by the automaton 200, the receiver 100 may not understand "Power spike" information, including the "Time" and "Spike amount" information. However, the sender 190 may include this information when generating data to send to the receiver 100.

Thus, returning to FIG. 1, in various embodiments, the techniques described herein may address a mismatch between a sender 190 and receiver 100, such as the one described above, by identifying data that can be understood by the receiver 100 according to its version of the data exchange interface, and by removing data that cannot be understood by the receiver 100. In various embodiments the removal may include omission of one or ones of data that are not identified as conforming to the receiver's version of the data exchange interface.

In various embodiments, the sender 190 may communicate with the receiver 100 via a serializer 150. In various embodiments, the serializer may be configured to receive data that has been generated and to write that data to a communication medium for communication to the receiver 100. In various embodiments, the serializer 150 may be configured to write data to various communications media, including, but not limited to, wired or wireless networks, transitory and non-transitory computer-readable media, and other media. In various embodiments, the serializer 150 may be configured to write the data according to various formats with or without compression. In various embodiments, the serializer may be configured to compress data before writing it based on one or more knowledge representations of the generated data. Additional examples of the serializer 150 may be found in U.S. Pat. No. 7,565,339.

In various embodiments, the serializer 150 may also be configured to perform the above-described identification and removal of data. Thus in various embodiments, the serializer 150 may identify data which may be understood by the receiver 100 based on the receiver's version of the data exchange interface and may remove data that cannot be understood by the receiver. Thus, the serializer 150 may thereby send data which is adapted to be understood by a receiver based on the receiver's version of the data exchange interface. In various embodiments, the serializer may therefore be configured to consult a grammar, an interface definition, an automaton, or other information describing the version of the data exchange interface used by the receiver 100 and to remove data that is not described in this information as appropriate. Thus, in the illustrated example, the serializer 150 may have knowledge of multiple versions of the data exchange interface, such as V1 110, V2 120, and V3 130, in order to communicate with different receivers that each utilize these different versions of the data exchange interface. In various embodiments, the serializer 150 may perform this removal during a writing of the generated data to a communication medium. In various embodiments, the serializer 150 may perform this removal by omitting the one or ones of data that cannot be understood by the receiver 100 during the writing. In various embodiments, the serializer 150 may be configured to perform this omission by omitting data that would otherwise cause an error according to the serializer 150's consultation of the description of the receiver 100's version of the data exchange interface. In various embodiments, the serializer 150 may be configured to determine a length of the data that would otherwise cause an error and to omit the writing of data until this length is reached.

Figure 3:
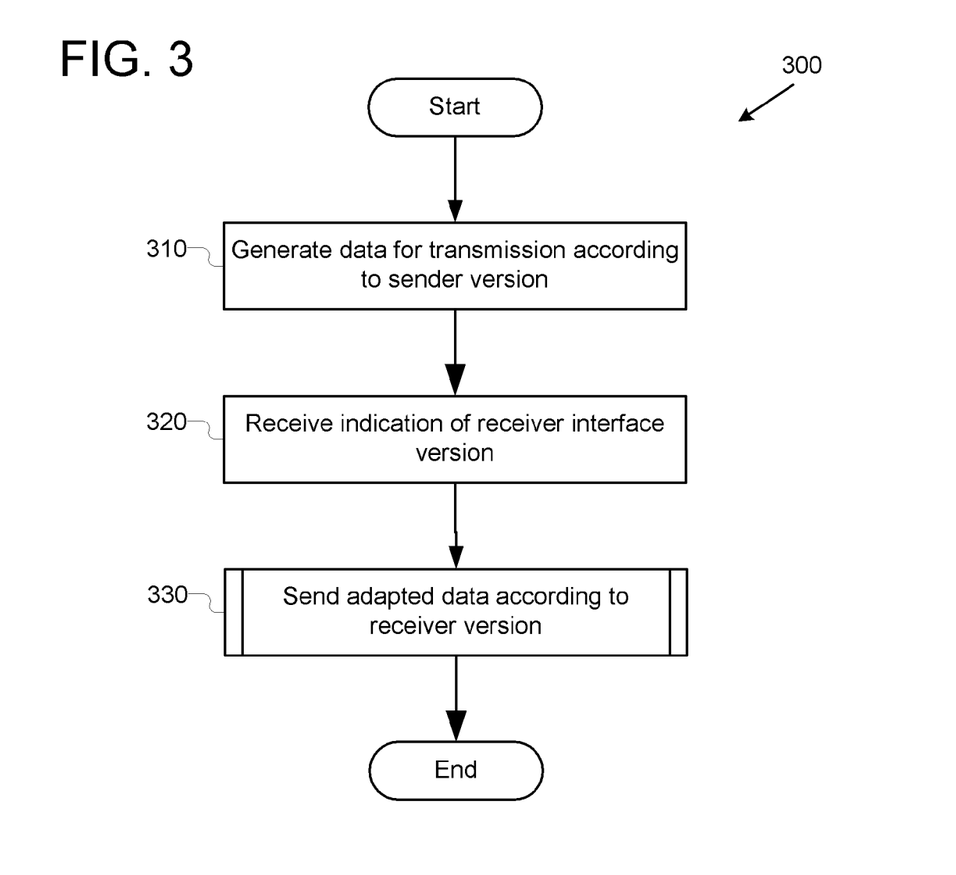
FIG. 3 illustrates an example interface-adaptive data exchange process, in accordance with various embodiments.

FIG. 3 illustrates an example interface-adaptive data exchange process 300, in accordance with various embodiments. In various embodiments, the process may be performed by the sender 190 to send data to the receiver 100 such that the data will be understood by the receiver 100 according to the version of a data exchange interface used by the two devices. While process 300 lists various actions in a particular order, in various embodiments, one or more actions of process 300 may be repeated, changed in order, combined, or omitted entirely. the process may begin at operation 310, where the generator 140 of the sender 190 may generate data for transmission to the receiver 100. In various embodiments, the generator 140 may generate the data according to a version of the data exchange interface used by the sender 190, regardless of any version of the data exchange interface that may be used by the receiver 100. For example, if the generator 140 is generating data to send to a power meter according to the automaton 200 describe above, the generator 140 may include both "Usage" data and "Power spike" data regardless of whether the receiver 100 may be configured to understand the data.

Next, at operation 320, the sender 190 may receive an indication of a version of the data exchange interface used by the receiver 100. In various embodiments, this indication may be received from the receiver 100 in response to a request sent to the receiver 100 at or near the time of transmission of data to the receiver 100. In other embodiments, the receiver 100 may have previously indicated which version of the data exchange interface it is using. In yet other embodiments, the sender 190 may assume a version of the data exchange interface; for example, if information cannot be received from the receiver 100, the data exchange interface may default to an early version of the data exchange interface. Particular examples of interface negotiation may be described in U.S. Pat. No. 7,853,724, entitled "Automatic Identification, Negotiation, Synchronization, and Update of System Interfaces," filed Jun. 19, 2008, which is hereby incorporated by reference in its entirety. Next, at operation 330, the serializer 150 may send adapted data according to the version of the data exchange interface used by the receiver 100. Particular examples of this operation are described below with reference to process 400 of FIG. 4. The process may then end.

Figure 4:
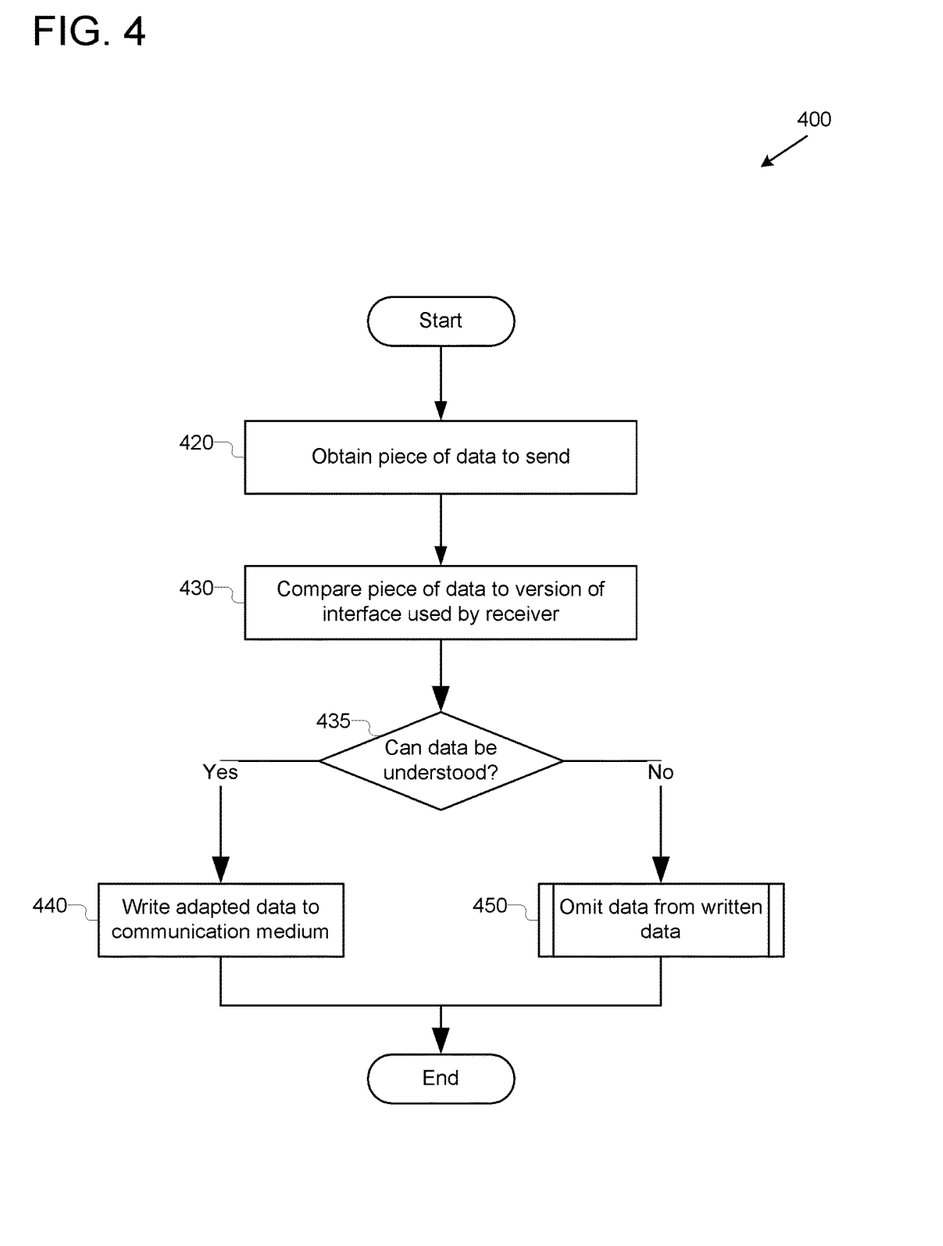
FIG. 4 illustrates an example adapted data sending process, in accordance with various embodiments.

FIG. 4 illustrates an example adapted data sending process 400, in accordance with various embodiments. In various embodiments, the process may include one or more implementations of operation 330 of process 300. While process 400 lists various actions in a particular order, in various embodiments, one or more actions of process 400 may be repeated, changed in order, combined, or omitted entirely. The process may begin at operation 420, where the serializer 150 may obtain a piece of data to send to the receiver 100. Next, at operation 430, the serializer 150 may compare the obtained piece of data to the version of the data exchange interface used by the receiver 100. Next, at decision operation 435, the serializer 150 may determine if the piece of data can be understood by the receiver based on the version of the data exchange interface used by the receiver 100. In some embodiment, the serializer 150 may make this determination by determining whether the piece of data is described in an interface definition (or other description of the version of the data exchange interface used by the receiver 100. In some embodiments, the serializer 150 may also determine at decision operation 435 whether the piece of data is permitted in a current context according to the interface definition or description. If the data can be understood, then at operation 440, the serializer 150 may write the piece of data as adapted data to the communication medium for receipt by the receiver 100. If not, then at operation 450, the serializer 150 may omit the data that cannot be understood from being written to the communication medium. Particular examples of this operation are described below with reference to process 500 of FIG. 5. The process may then end.

Figure 5:
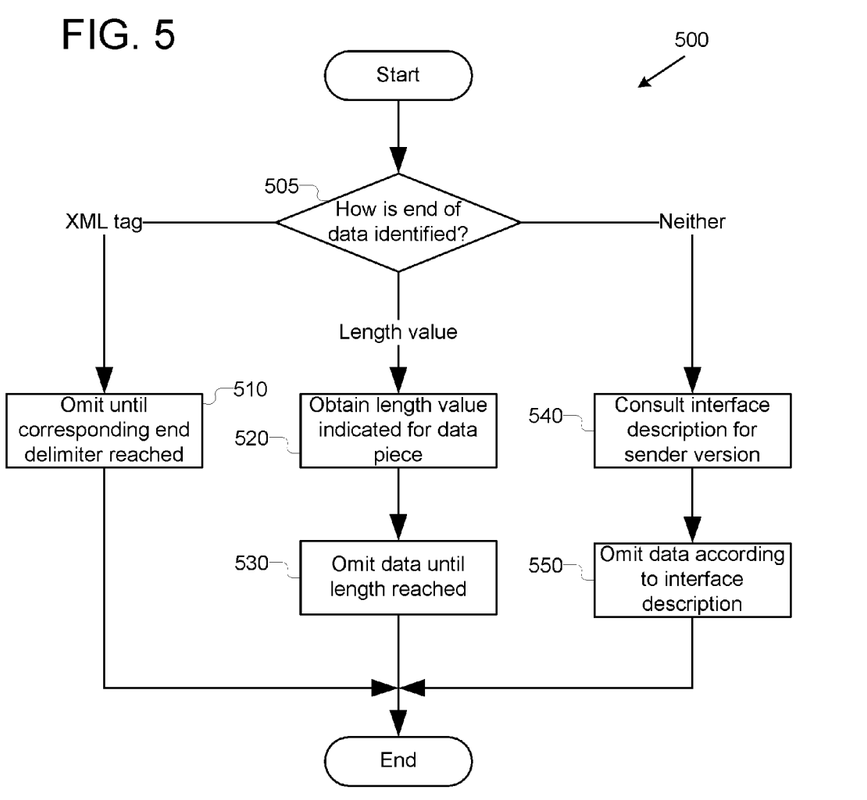
FIG. 5 illustrates an example data omission process, in accordance with various embodiments.

FIG. 5 illustrates an example data omission process 500, in accordance with various embodiments. In various embodiments, the process may include one or more implementations of operation 450 of process 400. While process 500 lists various actions in a particular order, in various embodiments, one or more actions of process 500 may be repeated, changed in order, combined, or omitted entirely. In various embodiments, the serializer 150 may perform different operations to omit data from being written, depending on a manner in which an end for the to-be-omitted piece of data is indicated. Thus, at decision operation 505, different operations may be performed depending on how the end is indicated. If the data is represented using a format with explicit end delimiters, such as XML or JSON, then at operation 510, the serializer may omit data until a corresponding end delimiter for the to-be-omitted data is reached, and the process may then end. By contrast, if the end of the data is indicated according to a length value for the data that is encoded in the data (such as in binary encoded data) then at operation 520 the serializer 150 may obtain the length value. Then, at operation 530, the serializer 150 may omit data until this length is reached and the process may then end.

If at operation 505 the serializer determines instead that there is neither an end delimiter nor a data length value to use to determine the end of the to-be-omitted data, the serializer 150 may not be able to determine, based solely on the generated data, how long to omit data from being written to the communication medium. Thus, at operation 540, the serializer 150 may consult a description of the version of the data exchange interface that is being used by the generator 140. For example, the serializer 140 may consult the version V3 130 in the example of FIG. 1. As discussed above, in various embodiments, the interface description may include one or more types of interface description that may be used to determine where a piece of data starts and ends, such as by providing a formal definition of the interface. These interface descriptions may include, but are not limited to, a grammar, an interface definition, an automaton, or other forms of description. Then, at operation 550, the serializer 150 may omit data until the end of the to-be-omitted data is reached according to the description of the data in the version of the data exchange interface used by the generator 140. The process may then end.

Figure 6:
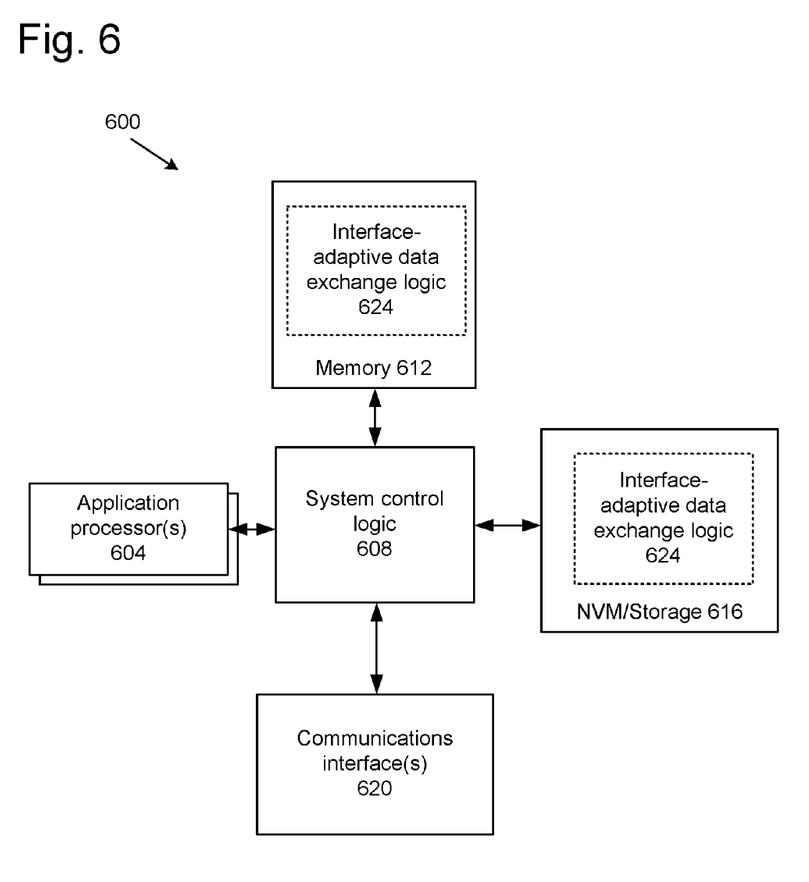
FIG. 6 illustrates an example computing environment suitable for practicing the disclosure, in accordance with various embodiments.

FIG. 6 illustrates, for one embodiment, an example computer system 600 suitable for practicing embodiments of the present disclosure. As illustrated, example computer system 600 may include control logic 608 coupled to at least one of the processor(s) 604, system memory 612 coupled to system control logic 608, non-volatile memory (NVM)/storage 616 coupled to system control logic 608, and one or more communications interface(s) 620 coupled to system control logic 608. In various embodiments, the one or more processors 604 may be a processor core.

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. In one embodiment, system memory 612 may include any suitable volatile memory, such as suitable dynamic random access memory ("DRAM"), for example.

System control logic 608, in one embodiment, may include one or more input/output ("I/O") controller(s) to provide an interface to NVM/storage 616 and communications interface(s) 620.

NVM/storage 616 may be used to store data and/or instructions, for example. NVM/storage 616 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 616 may include a storage resource physically part of a device on which the system 600 is installed or it may be accessible by, but not necessarily a part of, the device. For example, the NVM/storage 616 may be accessed over a network via the communications interface(s) 620.

System memory 612 and NVM/storage 616 may include, in particular, temporal and persistent copies of interface-adaptive data exchange logic 624. The interface-adaptive data exchange logic 624 may include instructions that when executed by at least one of the processor(s) 604 result in the system 600 practicing one or more of the operations described above for generator 140 and/or serializer 150. In some embodiments, the interface-adaptive data exchange logic 624 may additionally/alternatively be located in the system control logic 608.

Communications interface(s) 620 may provide an interface for system 600 to communicate over one or more network(s) and/or with any other suitable device. Communications interface(s) 620 may include any suitable hardware and/or firmware, such as a network adapter, one or more antennas, a wireless interface, and so forth. In various embodiments, communication interface(s) 620 may include an interface for system 600 to use NFC, optical communications (e.g., barcodes), BlueTooth or other similar technologies to communicate directly (e.g., without an intermediary) with another device.

For one embodiment, at least one of the processor(s) 604 may be packaged together with system control logic 608 and/or interface-adaptive data exchange logic 624 (in whole or in part). For one embodiment, at least one of the processor(s) 604 may be packaged together with system control logic 608 and/or interface-adaptive data exchange logic 624 (in whole or in part) to form a System in Package ("SiP"). For one embodiment, at least one of the processor(s) 604 may be integrated on the same die with system control logic 608 and/or interface-adaptive data exchange logic 624 (in whole or in part). For one embodiment, at least one of the processor(s) 604 may be integrated on the same die with system control logic 608 and/or interface-adaptive data exchange logic 624 (in whole or in part) to form a System on Chip ("SoC").

Computer-readable media (including non-transitory computer-readable media), methods, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable media comprising instructions stored thereon that are configured to cause a computing device, in response to execution of the instructions by the computing device, to:
    obtain data, at least a portion of which is to be sent to a receiver device, the data generated according to a first version of a data exchange interface, wherein the receiver device is configured to receive data configured according to a second version of the data exchange interface;
    identify one or more pieces of the data that can be understood by the receiver device based on comparison of the data to an interface definition for the second version of the data exchange interface, the interface definition containing a description of pieces of data which are permitted in the second version, wherein remaining unidentified one or ones of the data cannot be understood by the receiver device based on the interface definition for the second version of the data exchange interface; and
    remove the remaining unidentified one or ones of the data from the obtained data to generate adapted data to send to the receiver device based on the second version of the data exchange interface.

2. The one or more non-transitory computer-readable media of claim 1, wherein the instructions are further configured to cause the computing device to send the adapted data to the receiver device.

3. The one or more non-transitory computer-readable media of claim 1, wherein the interface definition comprises a grammar, an interface definition language, a schema, or a finite automata.

4. The one or more non-transitory computer-readable media of claim 1, wherein remove the remaining unidentified one or ones of the data comprises write the identified data to a communication medium as the adapted data, said write including omission of write of the unidentified one or ones of the data.

5. The one or more non-transitory computer-readable media of claim 1, wherein omission of write of the unidentified one or ones of the data comprises omission of write until an end delimiter for an unidentified piece of the data is reached.

6. The one or more non-transitory computer-readable media of claim 1, wherein omission of write of the unidentified one or ones of the data comprises omission of write until a data length for an unidentified piece of the data is reached.

7. The one or more non-transitory computer-readable media of claim 6, wherein omission of write of the unidentified one or ones of the data further comprises access of an interface definition for the first version of the interface to determine the data length for the unidentified piece of the data.

8. An apparatus for sending data to a receiver device configured to receive data configured according to a first version of a data exchange interface, the apparatus comprising:
    one or more computer processors; and
    a serializer component configured to be operated by the one or more computer processors to:
        obtain data, at least a portion of which is to be sent to the receiver device, the data generated according to a second version of the data exchange interface;

identify one or more pieces of the data that can be understood by the receiver device based on comparison of the data to an interface definition for the first version of the data exchange interface, the interface definition containing a description of pieces of data which are permitted in the first version, wherein remaining unidentified one or ones of the data cannot be understood by the receiver device based on the interface definition for the first version of the data exchange interface; and remove the remaining unidentified one or ones of the data from the data to generate adapted data to send to the receiver device based on the first version of the data exchange interface.

9. The apparatus of claim 8, further comprising a data generator configured to generate data according to the second version of the data exchange interface.

10. The apparatus of claim 8, wherein the serializer component is further configured to send the adapted data to the receiver device.

11. The apparatus of claim 8, wherein the interface definition comprises a grammar, an interface definition language, a schema, or a finite automata.

12. The apparatus of claim 8, wherein remove the remaining unidentified one or ones of the data comprises write the identified data to a communication medium as the adapted data, said write including one or more of:
   omission of write until an end delimiter for an unidentified piece of the data is reached; and
   omission of write until a data length for an unidentified piece of the data is reached.

13. A computer-implemented method for sending data to a receiving computing device configured to receive data configured according to a first version of a data exchange interface, the method comprising:
   obtaining data by a sending computing device, at least a portion of which is to be sent to the receiving computing device, the data generated according to a second version of the data exchange interface;
   identifying, by the sending computing device, one or more pieces of the data that can be understood by the receiving computing device based on comparison of the data to an interface definition for the first version of the data exchange interface, the interface definition containing a description of pieces of data which are permitted in the first version, wherein remaining unidentified one or ones of the data cannot be understood by the receiving computing device based on the interface definition for the first version of the data exchange interface; and
   removing, by the sending computing device, the remaining unidentified one or ones of the data from the data to generate adapted data to send to the receiving computing device based on the first version of the data exchange interface; and
   sending, by the sending computing device, the adapted data to the receiving computing device.

14. The method of claim 13, further comprising generating data, by the sending computing device, according to the second version of the data exchange interface.

15. The method of claim 13, wherein the interface definition comprises a grammar, an interface definition language, a schema, or a finite automata.

16. The method of claim 13, wherein removing the remaining unidentified one or ones of the data comprises writing the identified data to a communication medium as the adapted data, said writing including one or more of:
   omitting writing until an end delimiter for an unidentified piece of the data is reached; and
   omitting writing until a data length for an unidentified piece of the data is reached.

* * * * *